UNITED STATES PATENT OFFICE.

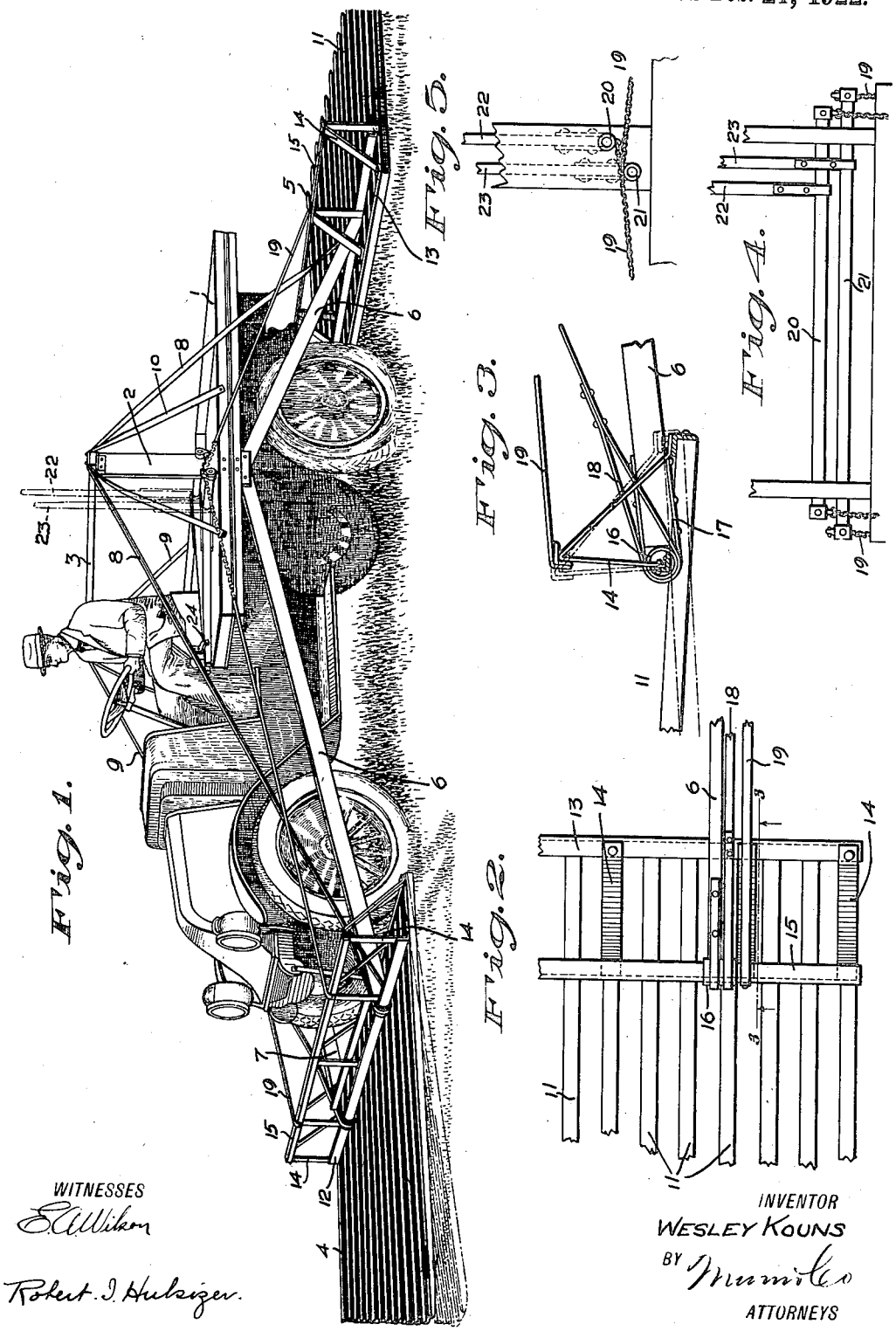

WESLEY KOUNS, OF SALINA, KANSAS.

HAYRAKE.

1,407,663.

Specification of Letters Patent. Patented Feb. 21, 1922.

Application filed December 7, 1920. Serial No. 428,945.

*To all whom it may concern:*

Be it known that I, WESLEY KOUNS, a citizen of the United States, and a resident of Salina, in the county of Saline and State of Kansas, have invented a new and Improved Hayrake, of which the following is a full, clear, and exact description.

This invention relates to a hay rake, and has particular reference to a new and improved form of hay rake which can be simply and efficiently attached to a vehicle body, such as a motor truck body.

An object of the invention is to provide a rake frame which can be readily attached to the body of a truck and can be simply and efficiently operated by the driver of the truck.

Another object of the invention resides in the provision of means whereby a rake frame can be attached to each end of the truck and connected thereto so that the load on the two frames can be lifted from the ground in a simple manner and balanced with respect to the body portion of the truck whereby undue strain is avoided.

A further object resides in the particular construction and arrangement of parts hereinafter described and claimed and shown in the accompanying drawings.

My invention, in general, comprises rake frames which can be attached to the front and rear of a truck and can be operated by the manipulation of a plurality of operating levers to lower the frames to the ground to receive the load of grain thereon, and can be raised readily and easily from the ground when the load is on the frames, whereby the loads may be easily and quickly transported to the desired place.

A further feature of the invention comprises a truss member mounted on the usual load-supporting platform of the truck and connected to the rake frames, whereby when the frames have a load disposed thereon the weight of the load is centered and supported from the load supporting platform of the truck, whereby the load is balanced with respect to the truck and undue strains on the truck are eliminated.

The invention is illustrated in the drawings, of which—

Figure 1 is a perspective view of the truck with a rake frame disposed at each end thereof and showing the truss connections with the main load-supporting platform;

Figure 2 is a partial plan view of a rake frame showing the connections between the frame and one end of the truss members;

Figure 3 is a section taken on the line 3—3 of Figure 2;

Figure 4 is a partial front elevation of the operating devices; and

Figure 5 is a partial side elevation of the operating members.

The application of the invention as illustrated in the drawings is a preferred embodiment thereof and comprises an automobile truck having a load-supporting platform 1. A plurality of uprights, one of which is shown and designated by the numeral 2, are suitably connected to the platform 1 at approximately the center of each lateral side thereof. The upper ends of these uprights 2 are connected by a crossbar 3 to maintain therebetween a rigid space relation.

At the front and rear of the truck are disposed rake frames 4 and 5 respectively. Each of these frames is connected, in a manner to be described hereinafter more in detail, by a pair of push rods 6 and 7 which extend from the rear portion of the frame to the underside of the platform 1 beneath the uprights 2, where they are suitably connected to the platform. A pair of pull rods 8 and 9 of any suitable material, preferably metal, also connect the rake frames 4 and 5 with the upper portion of the uprights 2 upon which the members 8 and 9 are suitably fastened. A strap 10 extends over the uprights 2 and connects to the body portion 1 on each side of the uprights and by this connection tends to reenforce the uprights 2 under the strain of the loads on the frames 4 and 5. As shown in Figure 1, it will be apparent that the truss members 6, 7, 8, 9 and 10 above described form a truss frame, acting as a rigid load-supporting connection between the center of the platform 1 and each of the rake frames 4 and 5, whereby when the loads are disposed on these rake frames the weight of the loads is balanced with respect to the center of the load-supporting platform 1 and concentrated at this point. In this manner, therefore, the loads are balanced with respect to the point of the platform 1 which is designed to bear loads, and, therefore, undue strains on the truck are eliminated.

Each rake frame comprises a plurality of longitudinally extending rake bars 11 which are connected in any suitable manner at their rear portions by a reach bar 12 extending transversely across the rake bars. This reach bar, as shown in the drawings, is in the form of an angle iron. The extreme rear upper faces of the rake bars 11 are connected by a metallic plate 13. Connected at suitable intervals across the rake frames 4 and 5, the reach bar 12 and the plate 13 are a plurality of frame angle brackets 14. These angle brackets are made preferably of any desired metal and the upper ends of the angles are connected by a bar 15 extending across the frame and parallel to the reach bar 12.

Loosely surrounding the reach bar 12 at points along the length thereof, in line with the push rods 6 and 7, are collars or sleeves 16 of any suitable material. The ends of the push rods 6 and 7 are disposed adjacent these collars. A strap of metal 17 is connected at each end to the push rods 6 and 7 and extends over and around the collars 16. This strap firmly connects the reach bar and the rake frames with the push rods but permit pivotal movement of the frames with respect to the push rods. Likewise, the ends of the pull rods 8 and 9 pass around the collar 16 in the form of a strap 18 to provide a rigid and firm connection between the pull rods and the rake frames. Each rake frame is adapted to be pivoted around the reach bar, and this pivotal action is effected by the connection to the bar 15 of each frame by a pair of operating links 19 of any suitable material, such as metal. These links, which may be chains, extend from the bar 15 to the base of the uprights 2 and are connected to transverse operating shafts 20 and 21 which extend across between the uprights 2 at the base thereof. The operating shaft 21 is disposed in a lower plane than the shaft 20 and is connected at its ends to the links 19 extending from the rear rake frame 5, whereas the shaft 20 is connected to the links 19 extending from the front frame 4.

It will be noticed, with respect to Figure 5 particularly, that the links 19 from the rear frame are connected to the upper side of the shaft 21, whereas the links 19 extending from the front frame are connected to the lower side of the shaft 20. The shafts 20 and 21 may be rotated around their axes by levers 22 and 23, respectively. These operating levers are within easy reach of the driver of the truck and when pulled down toward the driver's seat may be engaged beneath a hook or bracket 24 fastened to the side of the driver's seat, as seen in Figure 1.

By reason of the construction and arrangement of the rake frames and the truss members connecting each with the body platform 1, it is readily apparent that when a load is disposed on the frames the line of support of this load is concentrated along a vertical plane through the center of the platform 1. This is the normal plane of support of truck bodies and, therefore, these loads are balanced and concentrated in a normal plane, whereby strains on the body are eliminated. By reason of the long leverage of levers 23 compared to the short lever arm of the ends of the links 19, it is possible to operate these levers to raise a considerable load on each frame. By permitting the levers to be in the position shown in dotted lines in Fig. 1, the front portion of the rake bars 11 are also in contact with the ground, whereby the truck may move forward and rearward to slide under the load of grain to be received on the frame. When the load is thus disposed, the levers 22 and 23 are operated to raise the frame with the load from the ground; thereupon the ends of the levers 22 and 23 are hooked under the bracket 24 above described.

It will, therefore, be apparent that I have provided a simple and easily operated hay rake structure whereby loads may be supported at each end of a truck and be balanced with respect to the normal load-carrying portion of the truck to limit strain on the truck during the transportation of the loads. It will be apparent that minor modifications may be made in the arrangement and construction of this invention without departing from the spirit thereof.

What I claim is:

1. An attachment rake for use in connection with trucks having a load-supporting body portion, which comprises a rake frame disposed at each end of the truck and a truss frame connecting each rake frame with the load-supporting body portion of the truck, whereby the weight of the load carried on the rake frames is supported from the body portion.

2. A hay rake construction for use with trucks having a load-supporting body portion, which comprises rake frames formed from a plurality of rake bars, a reach bar extending across the rear portion of the rake bars and connected thereto, angle frames connected to the reach bar and the rake bars, rigid truss members extending from the rake frames to the body portion and loosely connected to the reach bar, operating links connected to the angle members, a plurality of operating shafts on the body portion to which the operating links are connected, and means for rotating said shafts to move the rake bars around the reach bar.

3. A hay rake construction for use in connection with trucks having a load-supporting body portion, which comprises a rake frame at each end of the truck, a truss member connected to the body portion and to each rake frame, pivotal connections between the rake frames and the truss member, means for moving each rake frame around its pivot point whereby the rake frames may be lowered or raised, and means for locking the operating means in a plurality of positions.

4. A hay rake construction for use in connection with trucks having a load-supporting body portion, which comprises a plurality of rake bars, a reach bar extending thereacross and connected thereto, a plurality of sleeves loosely surrounding the reach bar throughout its length, push rods forming part of a truss member rigidly connected to said sleeves, the other end of the push rods being connected to the body portion of the truck, a plurality of uprights on the body portion forming part of a truss member, pull rods extending from the upper ends of the uprights to said sleeves, a plurality of angle frames connected to the reach bar and to the rake bars, said angle frames having a portion spaced above and separate from the reach bar, a plurality of operating links connected to this portion of the angle frame, operating shafts connected to the other ends of the operating links, means for rotating the shafts whereby the rake frames through the operating links are moved around the reach bar as a pivot, and a plurality of reenforcing straps connected between the body portion of the truck and said uprights to reenforce the uprights in supporting the load.

5. A rake construction for use in connection with trucks having a body portion, which comprises a truss frame mounted on a body portion, a rake frame supported at each end of the truck, a plurality of truss members extending from the truss frame in different directions from the rake frames, means for pivotally connecting each frame to the truss members, means on the body portion for operating the pivoted rake frames, and connections between the rake frames and said operating means.

WESLEY KOUNS.